Patented May 13, 1947

2,420,366

UNITED STATES PATENT OFFICE 2,420,366

ADHESIVE TAPE AND METHOD OF USE IN PLYWOOD

Henry C. Geen, Grand Rapids, Mich., assignor to Haskelite Manufacturing Corporation, Grand Rapids, Mich., a corporation of New York No Drawing. Application February 19, 1943, Serial No. 476,493

7 Claims. (Cl. 117—122)

The invention relates to the fabrication of plywood and more particularly to the use of adhesive tape between the plies, and an adhesive tape for such use.

In the fabrication of flat plywood panels a number of sheets or layers of veneer are glued together to form a composite panel; each sheet is composed of strips or pieces of veneer, for example, 6 inches wide; a coat of glue is applied to the edges of the strips; the glue being then dried, then moistened with a solution of formaldehyde, and then by machines known as tapeless tapers or splicers, the edges are pressed together and run rather quickly between pressure plates and heated rollers at a temperature of approximately 350° F. to dry the glue between the edges of the veneer, so that the strips will be edge-glued together; the necessary number of strips are edge-glued together in this manner to form a sheet sufficiently greater in area than the finished panel to provide for trimming the margins, which are usually irregular, from the panel; the desired number of sheets of veneer thus formed are laid one upon the other with a thermo-setting glue, such as phenol formaldehyde alkali-condensed thermo-setting glue, between them and with the grain of contiguous sheets or plies at right angles to one another; and the assembled sheets or plies are then placed in a press or mold and subjected to the proper temperature and pressure to energize and permanently set the glue which forms a water resistant bond between the plies. The handling of the strips for edge-gluing, and the handling of the sheets in assembling the plies, frequently result in splitting or damaging the veneer, not only at their margins, but also in their inner areas. This makes it necessary to temporarily secure together the edges at the split until the assembly of sheets is placed in the press or mold.

Heretofore, so far as I am aware, it has been practically impossible to repair these splits except by adhesive tape applied to the exposed faces of the outer layers or plies of the panel or along the margins left for trim from the panel because it was necessary to remove the tape used for such repair from the finished panel. This practice was objectionable because the complete removal of the tape from the exposed faces of the panel was difficult, resulted in marring the outer face of the panel, and the tape left an indentation in the exposed faces produced from the pressure in the press. The tape could not be used between the layers or plies because it usually consisted of paper coated on one face with bone glue which becomes sticky when moistened and is not water resistant. It was objectionable to permit such tape to remain between the plies, because it was not water resistant.

In molding plywood into shells of single curvature it is sometimes necessary to assemble a series of pieces or sheets of veneer, each composed to form a single ply or layer and the layers are assembled in the mold with the grain in the contiguous sheets arranged at right angles to one another. In this fabrication it is important and necessary to retain the sheets of each layer in place in the mold to avoid relative movement between them, so their edges will not work apart or overlap at the joints while the plies are being superposed in the mold and until the shell has been molded to shape. Extreme care is necessary in retaining the sheets of each layer of veneer so their edges will not work apart or overlap. This handling also frequently results in splitting the veneer. For these purposes, it is necessary to use tape between the layers. The paper tape, as before stated, could not be satisfactorily used between the layers and was objectionable for that purpose.

The primary object of the invention is to provide an adhesive tape which can be used between the layers of the panel for efficiently securing the edges at a split or the edges between the sheets of a layer together between the plies or layers, and which does not require removal from the completed panel. This object is attained primarily by providing a film or tape of phenol formaldehyde alkali-condensed thermo-setting tape, strips of which can be placed between the edges of sheets of intermediate layers or plies or across the joint or across splits on the inner faces of any of the plies, which will effectively hold the parts together until the panel is subjected to heat and pressure in the mold, and which will readily spread over the wood in the veneer and be water resistant when the glue in the panel and the tape has set.

Another object of the invention is to facilitate the fabrication of plywood panels and shells by the use of a suitable adhesive tape between the layers, where necessary or desirable, and which can be permanently left in the finished product.

The invention consists in the several novel features which are hereinafter set forth and more particularly defined by claims at the conclusion hereof.

An exemplification of tape embodying the invention and adapted for application between plies of veneer is produced from a film, such as tissue paper, preferably .002" to .003" in thickness impregnated with phenol formaldehyde alkali-condensed thermo-setting glue, an example of which material is commercially known as "Tego." A roll of this film consisting of web, for example 50 inches wide and 500 yds. in length, is coated on one side in a coating machine, with a solution consisting, preferably, of a mixture of polyvinyl alcohol, 30 grams; phenolic formaldehyde alkali-condensed thermo-setting resin, such as is commercially known as "PR14," 15 grams; water, 238 grams; and methyl alcohol, 27 grams. The coated film is dried, re-rolled, and cut into rolls of tape, usually ¾" to 1" in width. The polyvinyl alcohol imparts wet-sticking characteristics to the surface of the wood to which the tape is applied. The phenolic formaldehyde alkali-condensed thermo-setting resin (PR14) provides the final insolubility with respect to solvents after the adhesive has passed through the bonding and curing process. The water and the methyl alcohol act as solvents for reducing the viscosity of the glue so that it will spread readily over the surface of the film to which it may be applied. This tape, when its coated side is subsequently moistened, will possess highly adhesive properties before the glue is cured, and so that the veneer to which it may be applied will be firmly secured together before the glue is cured.

In fabricating panels of plywood in the manner before stated, with sections or sheets of veneer edge-glued together, strips of the treated tape are torn from a roll and applied across a split in any part of a sheet of veneer, or lapped over margins of the strips of wood forming the sheets, wherever such is desirable, by moistening the coating on the tape and pressing it against the face of the wood sufficiently so the coating on the tape will spread, firmly adhere thereto, and secure the edges of the split or sections in the same layer in the plane of the layer or ply. In the outer layers of the plywood panel, the edges of the splits will be secured together by tape on the face which is not exposed. On the intermediate plies or layers, the strips of the coated tape may be applied to either face. Short strips of the tape may also be used to secure sheets together in edgewise relation wherever desired. In fabricating curved plywood shells, the tape is applied to repair splits in the same manner on the non-exposed faces of the outer sheets and either of the faces of the intermediate sheets or layers. The strips of tape are also applied to the margins of sheets in the same ply or layer to securely hold the edges of sheets of the same layer, wherever it is necessary or desirable, against working apart or overlapping at the joints when they are being, and after they have been, placed in the mold. The desired assembled number of plies, interleaved with a film of phenolic formaldehyde alkali-condensed thermo-setting resin, are subjected to pressure and heat in a press or in a mold until the interleaved glue and the strips of tape have been cured and become permanently set. The material in the strips of tape in the completed plywood panel or shell will be resistant to solvents and will be spread over and pass into the interstices in the faces of the veneer and will be so thin that no perceptable unevenness will be present in the outer faces of the finished panel or shell. As a result, no removal of the material in the tape is necessary or possible.

In the fabrication of shells having compound curvatures, each ply is usually composed of pieces of veneer cut into shapes to fit together in the mold, the edges of the strips are usually feathered, and the thermosetting glue is, in some instances, applied to the faces of the shapes before they are placed in the mold. The shaped pieces of each layer must be collocated in the mold before their edges can be glued together. In the fabrication of these shells it is important to prevent the pieces from working apart or creeping together after they have been placed in the mold. In fabricating these shells in accordance with the present invention, strips of tape which have been treated as before described are moistened on their coated faces and lapped across the seam between the pieces in the same layer for securing them in their arranged relation in the mold. The moistened side of the strips of tape will have highly adhesive properties before the pieces and the layers are bonded together, so that the strips of tape will prevent the pieces from working apart or creeping together while the shell is being assembled in the mold. After the layers of the shells have been assembled in the mold, they will be subjected to heat and pressure for thermosetting the glue between the faces of the plies and the glue in the tape.

The preferred formula hereinbefore specified for the solution with which the film is treated may be varied within the following ranges: poly vinyl alcohol, 8 to 40 grams; PR14, 4 to 20 grams; the water and methyl alcohol in any sufficient percentage to act as a solvent for reducing the viscosity of the glue to the desired extent for spreading. Ethyl alcohol, dimethyl ketone or isopropyl alcohol may be substituted for the methyl alcohol. Any of the following may be substituted for poly vinyl alcohol, viz: gum arabic, gum tragacanth.

The invention exemplifies an adhesive tape which can be used between the layers of plywood to secure together edges of splits in, or sheets of, wood-veneer in the same layer and which does not require removal of the material in the tape from the finished panel or shell. The invention also exemplifies a method of fabricating plywood in which the edges of splits in the veneer or between sheets of veneer in the layers respectively are secured by tape which is applied between the layers without objectionable result in the finished panel or shell.

The invention is not to be understood as restricted to the details set forth since these may be modified within the scope of the appended claims without departing from the spirit and scope of the invention.

Having thus described the invention, what I claim as new and desire to secure by Letters Patent is:

1. Tape adapted to secure together the margins of a sheet of wood veneer or a split therein comprising a thin paper film substantially .002" to .003" in thickness impregnated with alkali-condensed phenol formaldehyde synthetic resin, one face of which has a coating consisting of a solid solution of alkali-condensed phenol formaldehyde synthetic resin in polyvinyl alcohol, the coating being actuatable by moisture for adhesion of the tape to the veneer, with the resin in the coating adapted to be thermo-set with alkali-condensed phenol formaldehyde synthetic resin between plies of veneer to which the tape has been secured.

2. Tape adapted to secure together the margins of a sheet of wood veneer or a split therein comprising a thin paper film substantially .002" to .003" in thickness impregnated with alkali-condensed phenol formaldehyde synthetic resin, one face of which has a coating consisting of a solid solution of alkali-condensed phenol formaldehyde synthetic resin in polyvinyl alcohol, the coating being actuatable by moisture for adhesion of the tape to the veneer, with the resin in the coating adapted to be thermo-set and rendered water insoluble with alkali-condensed phenol formaldehyde synthetic resin between plies of veneer to which the tape has been secured.

3. Tape adapted to secure together the margins of a sheet of wood veneer or a split therein comprising a thin paper film substantially .002" to .003" in thickness impregnated with alkali-condensed phenol formaldehyde synthetic resin, one face of which has a dry coating consisting of a homogeneous mixture of alkali-condensed phenol formaldehyde synthetic resin in polyvinyl alcohol, the dry coating being produced from polyvinyl alcohol, 4 to 40 grams, phenolic formaldehyde alkali-condensed thermo-setting resin, 4 to 20 grams, and water and methyl alcohol in sufficient percentage to act as a solvent for reducing the viscosity of the glue for spreading it on the impregnated film.

4. Tape adapted to secure together the margins of a sheet of wood veneer or a split therein comprising a thin paper film substantially .002" to .003" in thickness impregnated with alkali-condensed phenol formaldehyde synthetic resin, one face of which has a dry coating consisting of a homogeneous mixture of alkali-condensed phenol formaldehyde synthetic resin in polyvinyl alcohol, the solid solution being produced from polyvinyl alcohol, substantially 15 grams, phenolic formaldehyde alkali-condensed thermo-setting resin, substantially 15 grams, and water and methyl alcohol in sufficient percentage to act as a solvent for reducing the viscosity of the glue for spreading it on the impregnated film.

5. Tape adapted to secure together the margins of a sheet of wood veneer or a split therein comprising a thin paper film substantially .002" to .003" in thickness impregnated with alkali-condensed phenol formaldehyde synthetic resin, one face of which has a dry coating consisting of a homogeneous mixture of alkali-condensed phenol formaldehyde synthetic resin in polyvinyl alcohol, the dry coating being produced from polyvinyle alcohol, 8 to 40 grams, phenolic formaldehyde alkali-condensed thermo-setting resin, 4 to 20 grams, and water and a member of the group consisting of methyl alcohol, ethyl alcohol, dimethyl ketone and iso-propyl alcohol in sufficient percentage to act as a solvent for reducing the viscosity of the glue for spreading before it is dried.

6. Tape adapted to secure together the margins of a sheet of wood veneer or a split therein comprising a thin paper film substantially .002" to .003" in thickness impregnated with alkali-condensed phenol formaldehyde synthetic resin, one face of which has a dry coating consisting of a homogeneous mixture of alkali-condensed phenol formaldehyde synthetic resin in polyvinyl alcohol, the solid solution being produced from polyvinyl alcohol, substantially 15 grams, phenolic formaldehyde alkali-condensed thermo-setting resin, substantially 15 grams, and water and a member of the group consisting of methyl alcohol, ethyl alcohol, dimethyl ketone, and iso-propyl alcohol, in sufficient percentage to act as a solvent for reducing the viscosity of the glue for spreading it on the impregnated film.

7. Tape adapted to secure together the margins of a sheet of wood veneer or a split therein comprising a thin paper film substantially .002" to .003" in thickness impregnated with alkali-condensed phenol formaldehyde synthetic resin, one face of which has a coating consisting of a solid solution of alkali-condensed phenol formaldehyde synthetic resin in a member of the group consisting of polyvinyl alcohol, gum arabic and gum tragacanth, the coating being actuatable by moisture for adhesion of the tape to the veneer, with the resin in the coating adapted to be thermo-set and with alkali-condensed phenol formaldehyde synthetic resin between plies of veneer to which the tape has been secured.

HENRY C. GEEN.

REFERENCES CITED

The following references are of record in the file of this patent:

UNITED STATES PATENTS

| Number | Name | Date |
| --- | --- | --- |
| 1,225,735 | McLaurin | May 8, 1917 |
| 1,322,257 | Miller | Nov. 18, 1919 |
| 1,370,666 | Novotny | Mar. 8, 1921 |
| 1,858,957 | Humphner | May 17, 1932 |
| 1,960,176 | Weber | May 22, 1934 |
| Re. 18,742 | Farrell | Feb. 21, 1933 |
| 2,031,275 | McLaurin | Feb. 18, 1936 |
| 2,039,284 | Hartzell | May 5, 1936 |
| 2,068,479 | Bowen | Jan. 19, 1937 |
| 2,098,083 | Bowen | Nov. 2, 1937 |
| 2,111,272 | Paulson | Mar. 15, 1938 |
| 2,150,698 | Nevin | Mar. 14, 1939 |
| 2,300,224 | Humphner | Oct. 27, 1942 |
| 2,310,292 | Humphner | Feb. 9, 1943 |
| 1,877,202 | Satow | Sept. 13, 1932 |
| 2,834,895 | Brossman | Dec. 1, 1931 |